(12) United States Patent
Yamagishi et al.

(10) Patent No.: US 11,092,799 B2
(45) Date of Patent: Aug. 17, 2021

(54) PHOSPHOR WHEEL APPARATUS, LIGHTING APPARATUS, AND PROJECTION TYPE IMAGE DISPLAY APPARATUS

(71) Applicant: Panasonic Intellectual Property Management Co., Ltd., Osaka (JP)

(72) Inventors: Shigekazu Yamagishi, Osaka (JP); Yusaku Nishikawa, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 16/567,539

(22) Filed: Sep. 11, 2019

(65) Prior Publication Data
US 2020/0089092 A1    Mar. 19, 2020

(30) Foreign Application Priority Data
Sep. 13, 2018 (JP) .............................. JP2018-171604

(51) Int. Cl.
| G03B 21/20 | (2006.01) |
| G02B 26/00 | (2006.01) |
| F21V 29/503 | (2015.01) |
| F21K 9/64 | (2016.01) |
| F21V 29/67 | (2015.01) |

(52) U.S. Cl.
CPC .............. *G02B 26/008* (2013.01); *F21K 9/64* (2016.08); *F21V 29/503* (2015.01); *F21V 29/67* (2015.01); *G03B 21/204* (2013.01)

(58) Field of Classification Search
CPC ..... G03B 21/204; F21V 29/503; F21V 29/67; F21K 9/64; G02B 26/008
See application file for complete search history.

(56) References Cited

U.S. PATENT DOCUMENTS

| 2016/0077326 A1* | 3/2016 | Yamagishi | ............. G02B 7/008 353/61 |
| 2016/0077415 A1* | 3/2016 | Motoya | ................. H01S 5/0092 353/84 |
| 2017/0175989 A1 | 6/2017 | Yamagishi et al. | |
| 2017/0227192 A1* | 8/2017 | Ikeda | ..................... G03B 21/16 |
| 2017/0261844 A1* | 9/2017 | Kitade | ................... G03B 21/16 |

(Continued)

FOREIGN PATENT DOCUMENTS

| JP | 2015-118107 | 6/2015 |
| JP | 2016-61852 | 4/2016 |

(Continued)

*Primary Examiner* — Michelle M Iacoletti
*Assistant Examiner* — Magda Cruz
(74) *Attorney, Agent, or Firm* — Wenderoth, Lind & Ponack, L.L.P.

(57) ABSTRACT

A phosphor wheel apparatus includes: a substrate made of a heat conductive material having a first light reflectance, the substrate having first and second surfaces facing each other; a phosphor layer disposed on the first surface of the substrate; an adhesive layer bonding the substrate and the phosphor layer to each other; and a plurality of fins disposed on the second surface of the substrate, wherein the adhesive layer includes an adhesive having first thermal conductivity and filler particles, and the filler particles have second thermal conductivity higher than the first thermal conductivity, and have a second light reflectance higher than the first light reflectance.

7 Claims, 8 Drawing Sheets

(56) References Cited

U.S. PATENT DOCUMENTS

| | | | |
|---|---|---|---|
| 2017/0293211 A1* | 10/2017 | Kobayashi | G02B 26/008 |
| 2018/0031957 A1* | 2/2018 | Egawa | H04N 9/3158 |
| 2018/0095348 A1 | 4/2018 | Asano | |
| 2018/0173086 A1* | 6/2018 | Noda | G03B 21/2066 |
| 2018/0224731 A1* | 8/2018 | Yoshikawa | H04N 9/3114 |
| 2019/0072264 A1* | 3/2019 | Nagatani | F21V 29/502 |
| 2019/0369469 A1* | 12/2019 | Ishige | F21V 29/60 |
| 2020/0109899 A1* | 4/2020 | Sano | G03B 21/204 |

FOREIGN PATENT DOCUMENTS

| | | |
|---|---|---|
| JP | 2016-118604 | 6/2016 |
| JP | 2017-116935 | 6/2017 |
| JP | 2017-138573 | 8/2017 |
| JP | 2018-36457 | 3/2018 |
| WO | 2016/185851 | 11/2016 |

* cited by examiner

PHOSPHOR WHEEL APPARATUS, LIGHTING APPARATUS, AND PROJECTION TYPE IMAGE DISPLAY APPARATUS

BACKGROUND

1. Technical Field

The present disclosure relates to, for example, a phosphor wheel apparatus used as a light source of a projection type image display apparatus, and a lighting apparatus and a projection type image display apparatus provided with such a phosphor wheel apparatus.

2. Related Art

With the advance of solid-state light source technique, as a light source of a projection type image display apparatus, a conventional discharge tube lamp is being replaced with a solid-state light source such as a light emitting diode or a semiconductor laser element. The light emitting diode and the semiconductor laser element have advantages such as long life, containing no mercury, and no explosion. In particular, the semiconductor laser element has small output power from a single element but relatively small etendue of output light. Accordingly, there is also provided a device in which a plurality of semiconductor laser elements is arrayed and integrated. By using such a semiconductor laser element or its array, for example, a high-power projection type image display apparatus with power of over 5000 lumens is provided.

Among semiconductor laser elements, a semiconductor laser element that generates blue light is particularly superior in terms of efficiency and power. In the projection type image display apparatus, in order to obtain white light, a configuration in which a semiconductor laser element that generates blue light and a phosphor that generates yellow light from blue light are combined has become mainstream.

It is required to increase output power of a projection type image display apparatus equipped with a solid-state light source. However, even with a relatively high efficiency YAG-based phosphor, only about half of energy of light incident on the phosphor can be converted into fluorescence, and the remaining energy becomes heat. If this heat is not removed from the phosphor, a temperature of the phosphor rises, leading to a decrease in fluorescence conversion efficiency and reliability. In particular, when the light incident on the phosphor is converged in a point shape, the temperature rise of the phosphor becomes remarkable. Therefore, it is necessary to use the phosphor and cooling means in combination. Generally, a phosphor is formed in an annular shape on a surface of a disk-shaped substrate and rotated by a motor (in the present specification, such a configuration is referred to as a "phosphor wheel apparatus") to increase an effective surface area of the phosphor and to promote heat exchange with air. In recent years, further increase in brightness of a projection type image display apparatus is required, a phosphor for converting incident light with high efficiency and a configuration thereof are needed. In addition, cooling means that can be realized efficiently and inexpensively is needed.

In view of such problems, conventionally, for example, the inventions of JP 2015-118107 A, JP 2018-036457 A, WO 2016/185851, and JP 2017-116935 A have been proposed.

JP 2015-118107 A and JP 2018-036457 A disclose that an adhesive for bonding a phosphor to a substrate includes a thermally conductive filler, and this inclusion improves a cooling property. In this case, heat is easily conducted from the phosphor to the substrate, but means for cooling the substrate is not disclosed.

WO 2016/185851 and JP 2017-116935 A disclose a configuration in which means for improving a cooling property is provided on a back surface of a rotating substrate on which a phosphor is formed. WO 2016/185851 discloses an overview of various configurations for increasing a surface area. JP 2017-116935 A discloses formation of protruding shapes to increase a surface area.

In JP 2015-118107 A and JP 2018-036457 A, thermal conduction only in the vicinity of the phosphor is considered, and heat of the phosphor and the vicinity thereof cannot be sufficiently removed. In WO 2016/185851 and JP 2017-116935 A, although various configurations for increasing the surface area are disclosed, restrictions may be added to a realization method (construction method).

SUMMARY OF THE INVENTION

An object of the present disclosure is to provide a phosphor wheel apparatus capable of cooling a heated phosphor with a simple configuration and with higher efficiency than before.

A phosphor wheel apparatus of one aspect of this disclosure includes a substrate made of a heat conductive material having a first light reflectance, the substrate having first and second surfaces facing each other, a phosphor layer disposed on the first surface of the substrate, an adhesive layer bonding the substrate and the phosphor layer to each other, and a plurality of fins disposed on the second surface of the substrate. The adhesive layer includes an adhesive having first thermal conductivity and filler particles, and the filler particles have second thermal conductivity higher than the first thermal conductivity, and have a second light reflectance higher than the first light reflectance.

According to the phosphor wheel apparatus according to one aspect of the present disclosure, a heated phosphor can be cooled with a simple configuration and with higher efficiency than in a conventional case.

DETAILED DESCRIPTION OF EMBODIMENTS

Hereinafter, preferred embodiments will be described in detail with reference to the drawings as appropriate. However, detailed explanation more than necessary may be omitted. For example, detailed explanation of already well-known matters and redundant explanation on substantially the same configuration may be omitted. This is to avoid the unnecessary redundancy of the following description and to facilitate understanding by those skilled in the art.

It is to be noted that the attached drawings and the following description are provided to enable those skilled in the art to fully understand the present disclosure, and they are not intended to limit a subject matter recited in the claims.

First Embodiment

A lighting apparatus provided with a phosphor wheel apparatus according to a first embodiment will be described below with reference to FIGS. 1 to 8.

1-1. Overall Configuration

Figure 1:
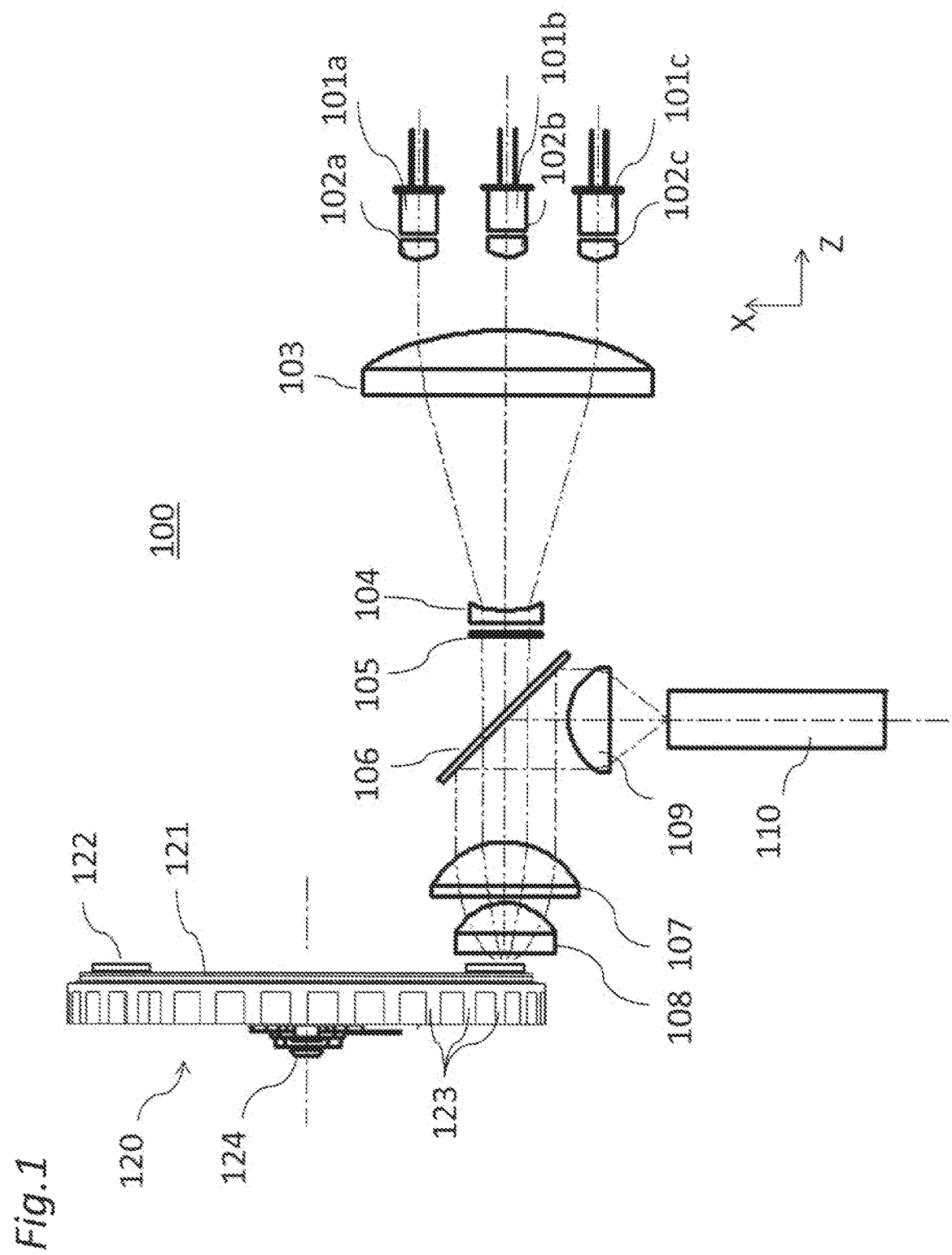
FIG. 1 is a schematic view showing a configuration of a lighting apparatus 100 provided with a phosphor wheel apparatus 120 according to the first embodiment.
Figure 3:
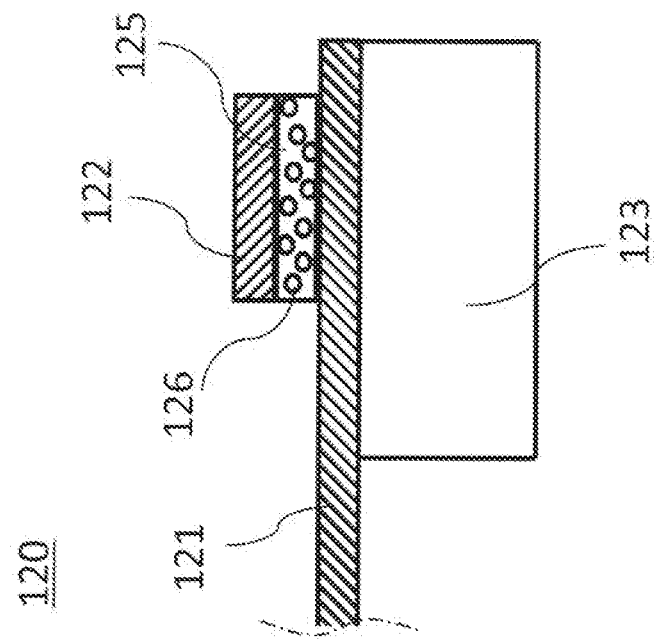
FIG. 3 is a cross-sectional view showing a configuration in the vicinity of an outer periphery of the phosphor wheel apparatus 120 of FIG. 1.
Figure 2:
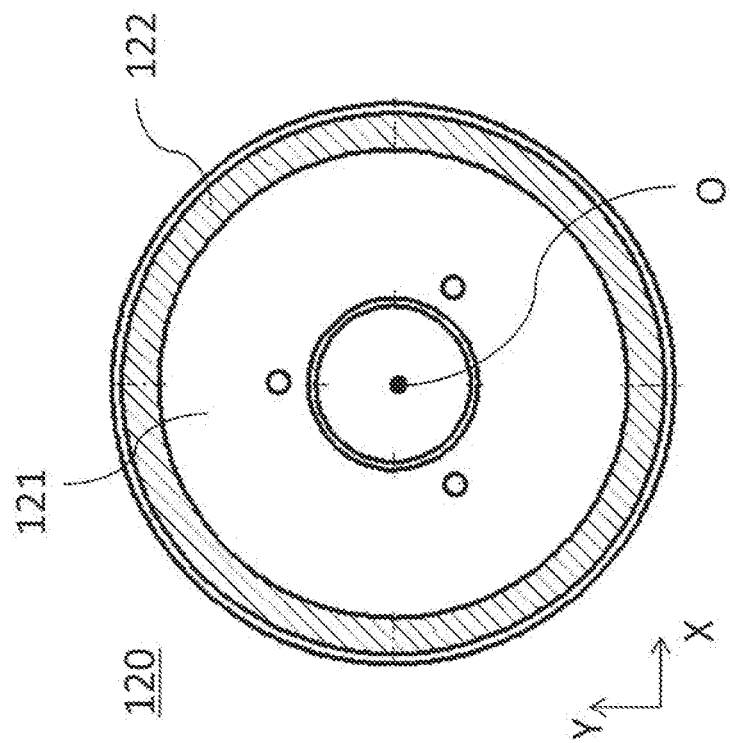
FIG. 2 is a plan view showing a configuration of a front surface of the phosphor wheel apparatus 120 of FIG. 1.
Figure 5:
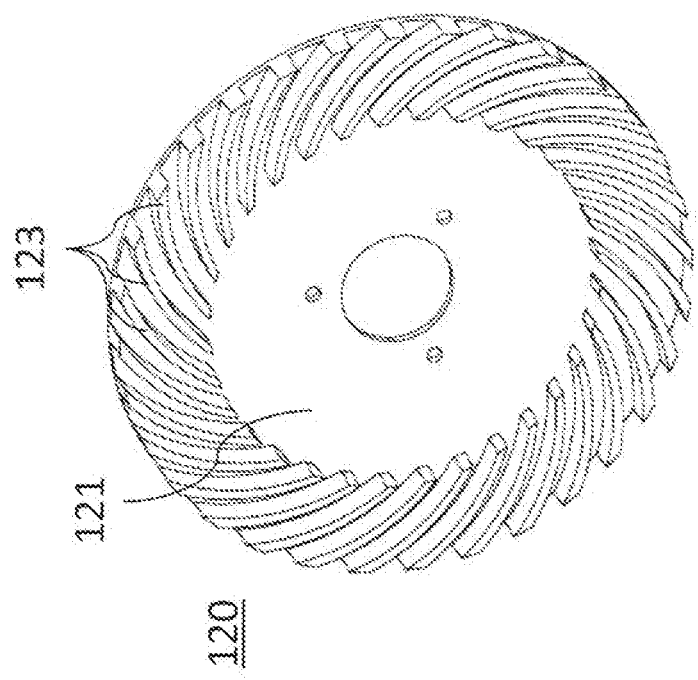
FIG. 5 is a perspective view showing a configuration of a rear surface of the phosphor wheel apparatus 120 of FIG. 1.
Figure 4:
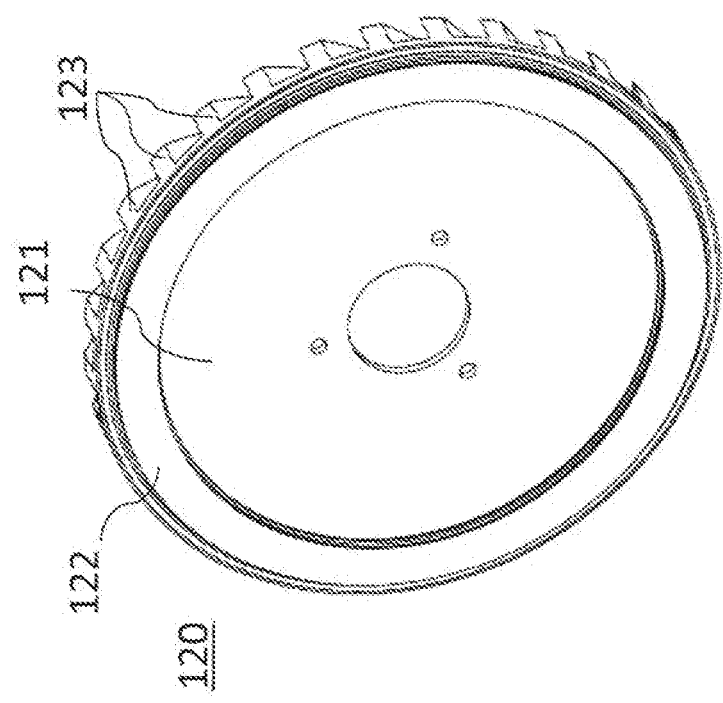
FIG. 4 is a perspective view showing the configuration of the front surface of the phosphor wheel apparatus 120 of FIG. 1.

FIG. 1 is a schematic view showing a configuration of a lighting apparatus 100 provided with a phosphor wheel apparatus 120 according to the first embodiment. FIG. 2 is a plan view showing a configuration of a front surface of the phosphor wheel apparatus 120 of FIG. 1. FIG. 3 is a cross-sectional view showing a configuration in the vicinity of an outer periphery of the phosphor wheel apparatus 120 of FIG. 1. FIG. 4 is a perspective view showing the configuration of the front surface of the phosphor wheel apparatus 120 of FIG. 1. FIG. 5 is a perspective view showing a configuration of a rear surface of the phosphor wheel apparatus 120 of FIG. 1.

Referring to FIG. 1, the lighting apparatus 100 includes semiconductor laser elements 101a, 101b, and 101c, collimating lenses 102a, 102b, and 102c, lenses 103, 104, 107, 108, and 109, a diffusion plate 105, a dichroic mirror 106, a rod integrator 110, and a phosphor wheel apparatus 120.

The semiconductor laser elements 101a to 101c generate blue light for exciting a phosphor of the phosphor wheel apparatus 120. The blue light emitted from the semiconductor laser elements 101a to 101c in a −Z direction is collimated by the collimating lenses 102a to 102c, and then converged by the lenses 103 and 104 constituting an afocal system to enter the diffusion plate 105. The blue light incident on the diffusion plate 105 is diffused here, and then enters the dichroic mirror 106.

The dichroic mirror 106 has a characteristic of transmitting blue light and reflecting the other color component light, and is disposed inclined at 45 degrees with respect to an optical axis. The blue light incident on the dichroic mirror 106 from the diffusion plate 105 and transmitted is incident on the phosphor wheel apparatus 120 via the lenses 107 and 108.

Referring to FIGS. 2 and 3, the phosphor wheel apparatus 120 includes a substrate 121, a phosphor 122, a plurality of fins 123, a drive apparatus 124, an adhesive 125, and filler particles 126. In the present specification, in the phosphor wheel apparatus 120, a surface on which the blue light from the semiconductor laser elements 101a to 101c is incident (a surface on a +Z side in FIG. 1, a surface shown in FIG. 2) is referred to as a "first surface" or a "front surface", and a surface opposite thereto (a surface on a −Z side in FIG. 1) is referred to as a "second surface" or a "rear surface".

The substrate 121 is made of a heat conductive material formed in a circular shape, and has front and rear surfaces facing opposite to each other.

The phosphor 122 is formed in a plate shape and a ring shape, and is disposed on the front surface of the substrate 121. The phosphor 122 is, for example, a sintered ceramic. The phosphor 122 is fixed to the substrate 121 by the adhesive 125 that is mixed so that the filler particles 126 are diffused and distributed. In this case, the phosphor 122 is fixed so as to be concentric around a rotation center O of the substrate 121. The phosphor 122 has, for example, a property of being excited by blue light to generate fluorescence of yellow light.

Figure 7:
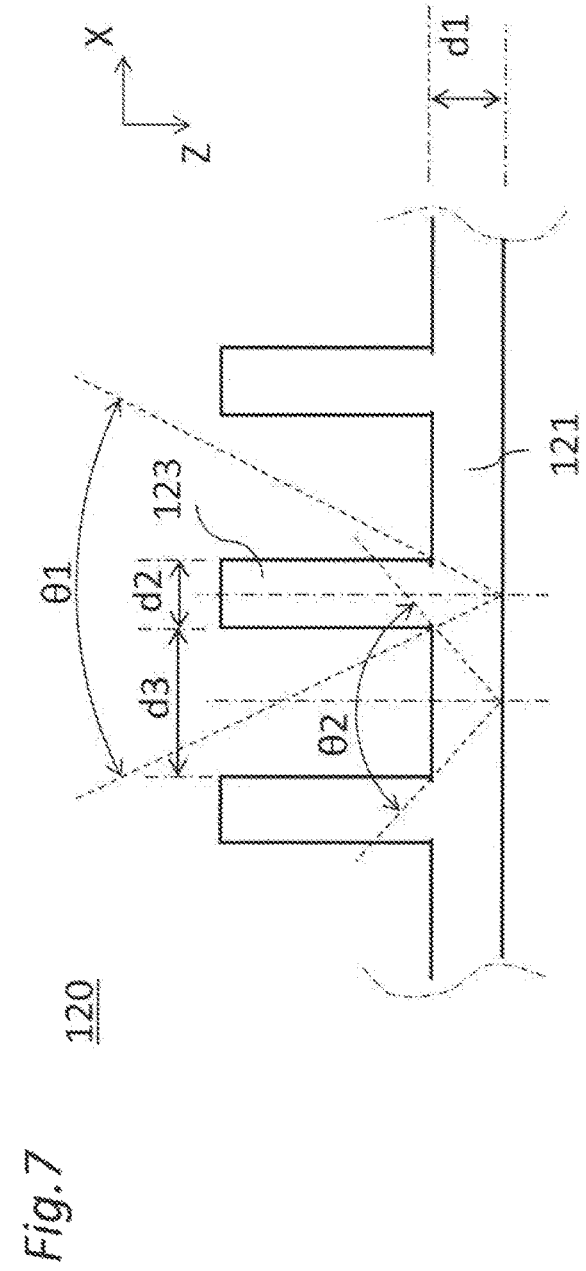
FIG. 7 is a side view showing a configuration of fins 123 of the phosphor wheel apparatus 120 of FIG. 1.

Each fin 123 is disposed on the rear surface of the substrate 121 at least over a range wider than a range in which the phosphor 122 is disposed on the front surface of the substrate 121. Each fin 123 is integrally formed with the substrate 121, for example (in other words, as illustrated in FIGS. 5 and 7, the fins 123 and the substrate 121 have a one-piece construction).

The drive apparatus 124 rotates the substrate 121 around the rotation center O.

The substrate 121 has a first light reflectance, and the adhesive 125 has first thermal conductivity. The filler particles 126 have second thermal conductivity higher than the first thermal conductivity, and have a second light reflectance higher than the first light reflectance.

In the present specification, the phosphor 122 is also referred to as a "phosphor layer", and, in addition, the adhesive 125 and the filler particles 126 are also collectively referred to as an "adhesive layer".

Referring back to FIG. 1, the blue light arrived at the phosphor wheel apparatus 120 from the semiconductor laser elements 101a to 101c is incident on the phosphor 122. The phosphor 122 is excited by the blue light to generate fluorescence of yellow light. The fluorescence of yellow light is reflected by the filler particles 126 and travels in a +Z direction of FIG. 1. Since the substrate 121 of the phosphor wheel apparatus 120 is rotated by the drive apparatus 124, an area of the light-irradiated phosphor can be expanded even when high-energy blue light is incident, and thus, generated heat when fluorescence generates can be suppressed.

The yellow light generated by the phosphor wheel apparatus 120 is incident on the dichroic mirror 106 through the lenses 107 and 108. As described above, the dichroic mirror 106 has a characteristic of transmitting blue light and reflecting the other color component light, so that the yellow light incident on the dichroic mirror 106 is reflected here and travels in the −X direction. The yellow light reflected by the dichroic mirror 106 is converged, through the lens 109, on an incident surface of the rod integrator 110 having a rectangular aperture disposed in front of the lens 109.

Thus, by using the phosphor wheel apparatus 120, the yellow light can be generated from the blue light. In the configuration of FIG. 1, light emitted from an emission surface of the rod integrator 110 is output light of the lighting apparatus 100. A necessary optical system is provided downstream of the emission surface of the rod integrator 110 to perform its function.

The lighting apparatus 100 may include a lens array formed of a plurality of rectangular shaped lenses, instead of the lens 109 and the rod integrator 110.

1-2. Configuration of Phosphor Wheel Apparatus

Next, a detailed configuration of the phosphor wheel apparatus 120 will be described.

As described above, the filler particles 126 have thermal conductivity higher than the thermal conductivity of the adhesive 125 and have a light reflectance higher than the light reflectance of the substrate 121. The filler particles 126 are, for example, titanium oxide. On the other hand, the substrate 121 is, for example, an aluminum alloy in terms of thermal conductivity, availability, and processability. Exemplary materials have, for example, the following thermal conductivity and light reflectance.

Thermal Conductivity
Adhesive: 0.1 W/m/K
Titanium oxide: 6.3 W/m/K
Light Reflectance
Aluminum alloy: 80%
Titanium oxide: 95%

The phosphor 122 excited by the blue light generates fluorescence of yellow light in all directions. Among them, fluorescence of yellow light generated toward the substrate 121 (that is, in the −Z direction) is reflected by the filler particles 126 (titanium oxide) before reaching the substrate 121 and is incident on the phosphor 122 again. The fluorescence passes through the phosphor 122 and is emitted from the surface on the +Z side of the phosphor 122. This eliminates the need for a reflective layer provided on a surface of a substrate. The reflective layer formed by vapor deposition etc. is very expensive. According to the present embodiment, performance equivalent to that of the prior art can be realized at lower cost than that of the prior art by eliminating the need for the reflective layer.

Note that, although an example using the filler particles 126 formed of titanium oxide has been described here, any material, for example, zinc oxide can be used, if the material has high thermal conductivity and a high light reflectance. Thermal conductivity of zinc oxide is 25.2 W/m/K, and a light reflectance thereof is 90%.

Figure 6:
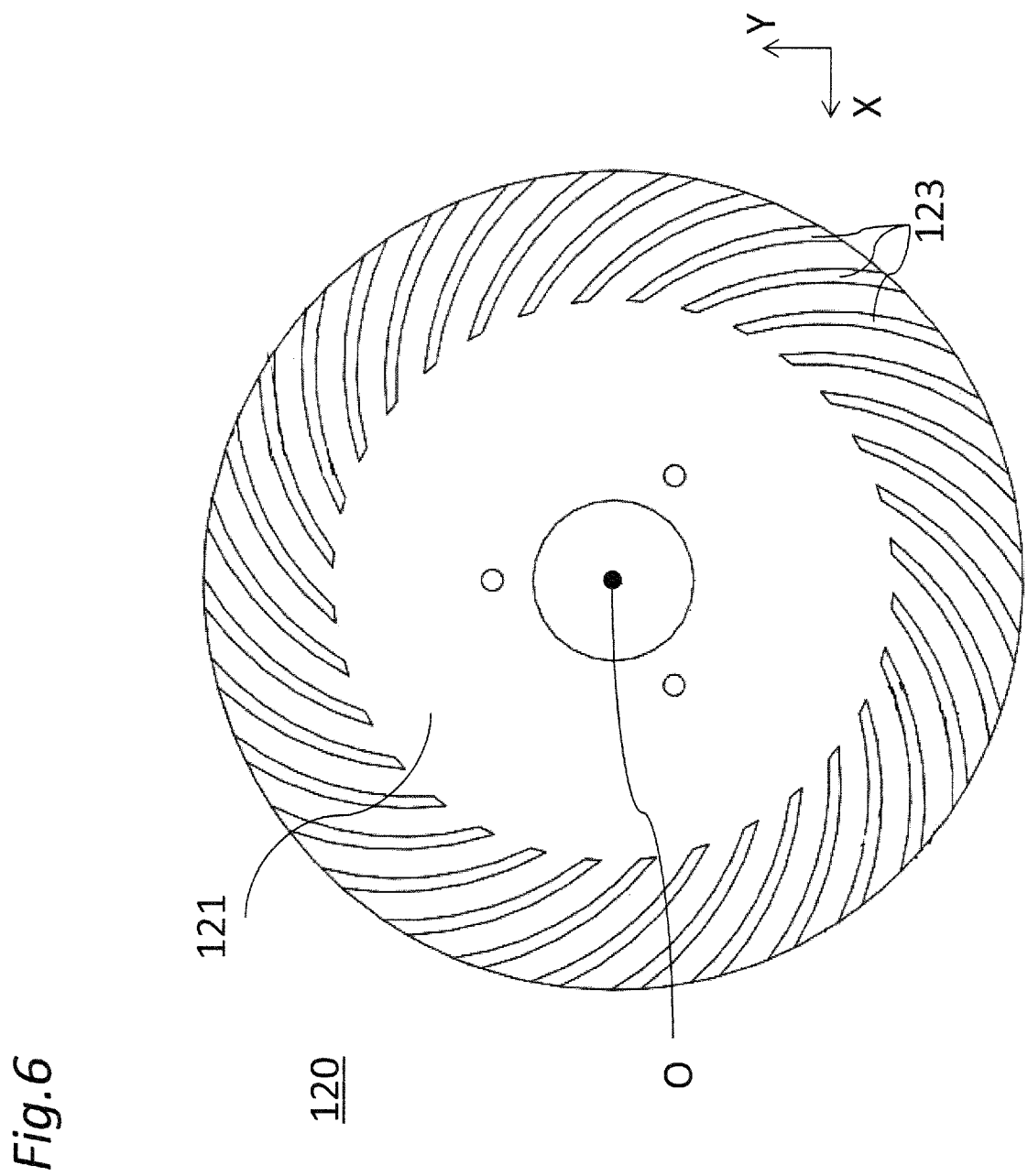
FIG. 6 is a plan view showing the configuration of the rear surface of the phosphor wheel apparatus 120 of FIG. 1.

FIG. 6 is a plan view showing a configuration of the rear surface of the phosphor wheel apparatus 120 of FIG. 1. Since strength of the substrate 121 is significantly different between a portion with the fin 123 and a portion without the fin 123, there is a concern that the substrate 121 may be bent. When the substrate 121 is bent, a distance between the lens 108 and the phosphor 122 changes. When this distance changes, the fluorescence conversion efficiency may decrease, and, in addition, unevenness in intensity of the fluorescence may occur depending on an angular position of the substrate 121. In the present embodiment, in order to make it difficult for the substrate 121 to bend, as shown in FIG. 6, the fins 123 are each formed in rotational symmetry with respect to the rotation center O of the substrate 121, and an arbitrary radius of the substrate 121 intersects with at least two fins 123. Each fin 123 may be formed in a straight line or in a curved line, and may be formed along a part of a spiral as shown in FIG. 6, for example. As a result, each fin 123 having a predetermined height with respect to the surface of the substrate 121 acts to suppress bending of the substrate 121, and a configuration that is resistant to bending can be provided.

FIG. 7 is a side view showing a configuration of the fins 123 of the phosphor wheel apparatus 120 of FIG. 1.

As described above, when the phosphor 122 is a ceramic and the substrate 121 is an aluminum alloy, there is a concern that a crack may occur in the phosphor 122 due to a difference in thermal expansion coefficients thereof. In particular, on the surface of the substrate 121, a temperature difference easily occurs between the portion with the fin 123 (that is, a portion easily cooled by the fin 123) and the portion without the fin 123 (that is, a portion that is difficult to be cooled by the fin 123). Thus, there is a concern that a crack may occur in a portion of the phosphor 122 facing the portion without the fin 123.

In the present embodiment, at a position corresponding to an outer periphery of the phosphor 122, the fins 123 are each formed to have dimensions shown in FIG. 7. Here, d1 represents a thickness of the substrate 121, d2 represents a width (thickness) of each fin 123, and d3 represents a distance between two fins 123 adjacent to each other. θ1 represents an angle viewing from the front surface (the surface on the +Z side) of the substrate 121 to the width d2 of one fin 123 on the rear surface (the surface on the −Z side) of the substrate 121. θ2 represents an angle viewing from the front surface of the substrate 121 to the distance d3 between the two fins 123 adjacent to each other on the rear surface of the substrate 121. At this time, each fin 123 is formed to satisfy $\theta 1<55°$ and $\theta 2<140°$. Definition of the angle θ1 can make it difficult for the substrate 121 to extend in the portion with the fin 123. In addition, definition of the angle θ2 can make it difficult for the substrate 121 to extend in the portion without the fin 123.

The inventors of the present disclosure confirmed by experiment that, by satisfying the dimensions described with reference to FIG. 7, the phosphor 122 was not broken even when the phosphor 122 made of ceramic was fixed to the substrate 121 made of aluminum alloy. In the experiment, A6063 was used as the aluminum alloy in terms of thermal conductivity and processability.

According to the phosphor wheel apparatus 120 according to the present embodiment, the filler particles 126 are mixed so as to be diffused and distributed in the adhesive 125 for fixing the phosphor 122 to the substrate 121, and further, the plurality of fins 123 is provided on the rear surface of the substrate 121. Therefore, the heated phosphor 122 can be cooled with a simple configuration and with higher efficiency than in a conventional case.

According to the phosphor wheel apparatus 120 according to the present embodiment, the phosphor 122 is directly fixed to the substrate 121 by the adhesive 125 mixed with the filler particles 126 having high thermal conductivity, so that the phosphor 122 can be cooled efficiently. Therefore, a decrease in efficiency due to temperature quenching caused by the temperature rise of the phosphor 122 can be less likely to occur.

The phosphor wheel apparatus 120 according to the present embodiment can be manufactured inexpensively by having a simple configuration. The phosphor wheel apparatus 120 according to the present embodiment can be manufactured inexpensively by not forming a reflective layer.

According to the phosphor wheel apparatus 120 according to the present embodiment, the phosphor wheel apparatus in which, even under a condition of being excited by high-power incident light, the phosphor efficiently emits light and, in addition, which operates with high reliability can be realized.

1-3. Modified Embodiment

Figure 8:
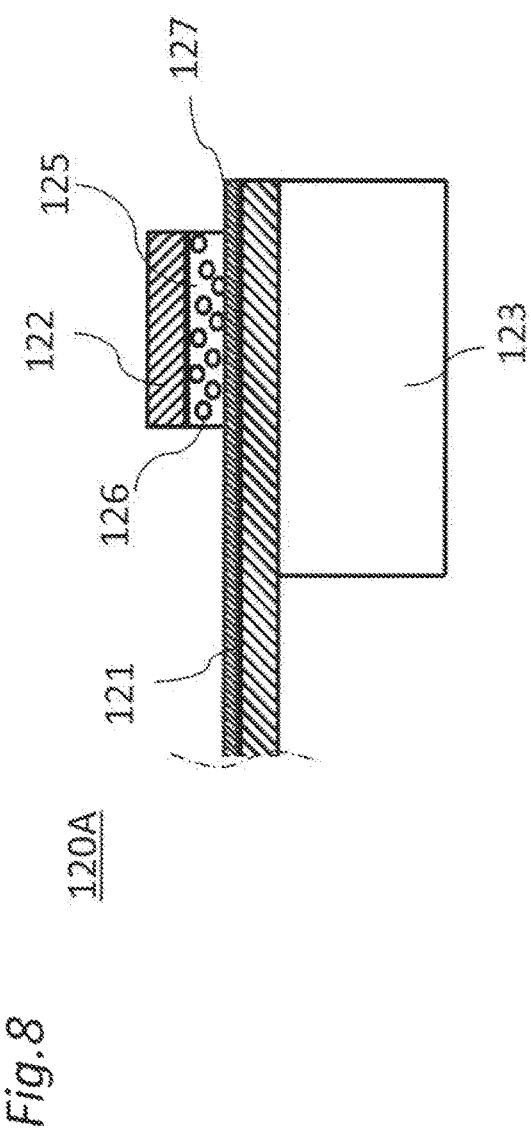
FIG. 8 is a cross-sectional view showing a configuration in the vicinity of an outer periphery of a phosphor wheel apparatus 120A according to a modified embodiment of the first embodiment.

FIG. 8 is a cross-sectional view showing a configuration in the vicinity of an outer periphery of a phosphor wheel apparatus 120A according to a modified embodiment of the first embodiment. The phosphor wheel apparatus 120A of FIG. 8 further includes a reflective layer 127 formed on the front surface of the substrate 121, in addition to the components of the phosphor wheel apparatus 120 of FIG. 3. The phosphor 122 is fixed to the reflective layer 127 by the adhesive 125 in which the filler particles 126 are mixed. The reflective layer 127 is, for example, a metal thin film. By providing the reflective layer 127, even if fluorescence generated by the phosphor 122 cannot be reflected only by the filler particles 126, the fluorescence can be reliably reflected.

1-4. Effects etc.

Configurations and effects of the phosphor wheel apparatus and the lighting apparatus according to the first embodiment are as follows.

The phosphor wheel apparatus 120 of the first embodiment includes: the substrate 121 made of a heat conductive material having a first light reflectance, the substrate 121 having first and second surfaces facing each other; the phosphor layer 122 disposed on the first surface of the substrate 121; the adhesive layer bonding the substrate 121 and the phosphor layer 122 to each other; and the plurality of fins 123 disposed on the second surface of the substrate 121. The adhesive layer includes an adhesive 125 having first thermal conductivity and filler particles 126. The filler particles 126 have second thermal conductivity higher than the first thermal conductivity, and have a second light reflectance higher than the first light reflectance.

As a result, the heated phosphor can be cooled with a simple configuration and with higher efficiency than in a conventional case.

According to the phosphor wheel apparatus 120 of the first embodiment, the phosphor layer 122 may be made of a ceramic.

As a result, for example, the phosphor wheel apparatus having higher reliability than in a case of using a phosphor of an organic material can be provided.

According to the phosphor wheel apparatus 120 of the first embodiment, the filler particles 126 may be made of titanium oxide.

As a result, the phosphor wheel apparatus can be sufficiently cooled, and, in addition, fluorescence can be reflected with high efficiency.

The phosphor wheel apparatus 120 of the first embodiment may further include the reflective layer formed between the substrate 121 and the adhesive layer.

As a result, the fluorescence can be reflected with further higher efficiency.

According to the phosphor wheel apparatus 120 of the first embodiment, the substrate 121 may have a circular shape, and the phosphor layer 122 may have a ring shape. The phosphor wheel apparatus 120 may further include the drive apparatus 124 which rotates the substrate 121.

As a result, even when high-energy blue light is incident, an area of the light-irradiated phosphor can be expanded. Hence, generated heat when fluorescence generates can be suppressed.

According to the phosphor wheel apparatus 120 of the first embodiment, the fins 123 may be configured to each be in rotational symmetry with respect to the rotation center O of the substrate 121, and an arbitrary radius of the substrate 121 may intersect with at least two fins 123.

This can make the substrate less likely to bend.

According to the phosphor wheel apparatus 120 of the first embodiment, the fins 123 may be formed so as to each be along a part of a spiral.

This can make the substrate less likely to bend.

According to the phosphor wheel apparatus 120 of the first embodiment, at a position corresponding to an outer periphery of the phosphor layer 122, when an angle viewing from the first surface to a width of one fin 123 on the second surface is represented by θ1 and an angle viewing from the first surface to a distance between two fins 123 adjacent to each other on the second surface is represented by θ2, each of the fins 123 may be formed to satisfy θ1<55° and θ2<140°.

As a result, even when the substrate actually receives heat from the phosphor, distortion caused by a difference in thermal expansion on a surface of the substrate can be suppressed, and the phosphor bonded to the substrate can be supported without cracking.

The lighting apparatus 100 of the first embodiment includes: the semiconductor laser elements 101a to 101c, and the phosphor wheel apparatus 120 or 120A.

As a result, the heated phosphor can be cooled with a simple configuration and with higher efficiency than in a conventional case, and yellow light can be generated from blue light.

Second Embodiment

Hereinafter, with reference to FIGS. 9 to 10, a lighting apparatus provided with a phosphor wheel apparatus according to a second embodiment will be described.

2-1. Configuration

Figure 9:
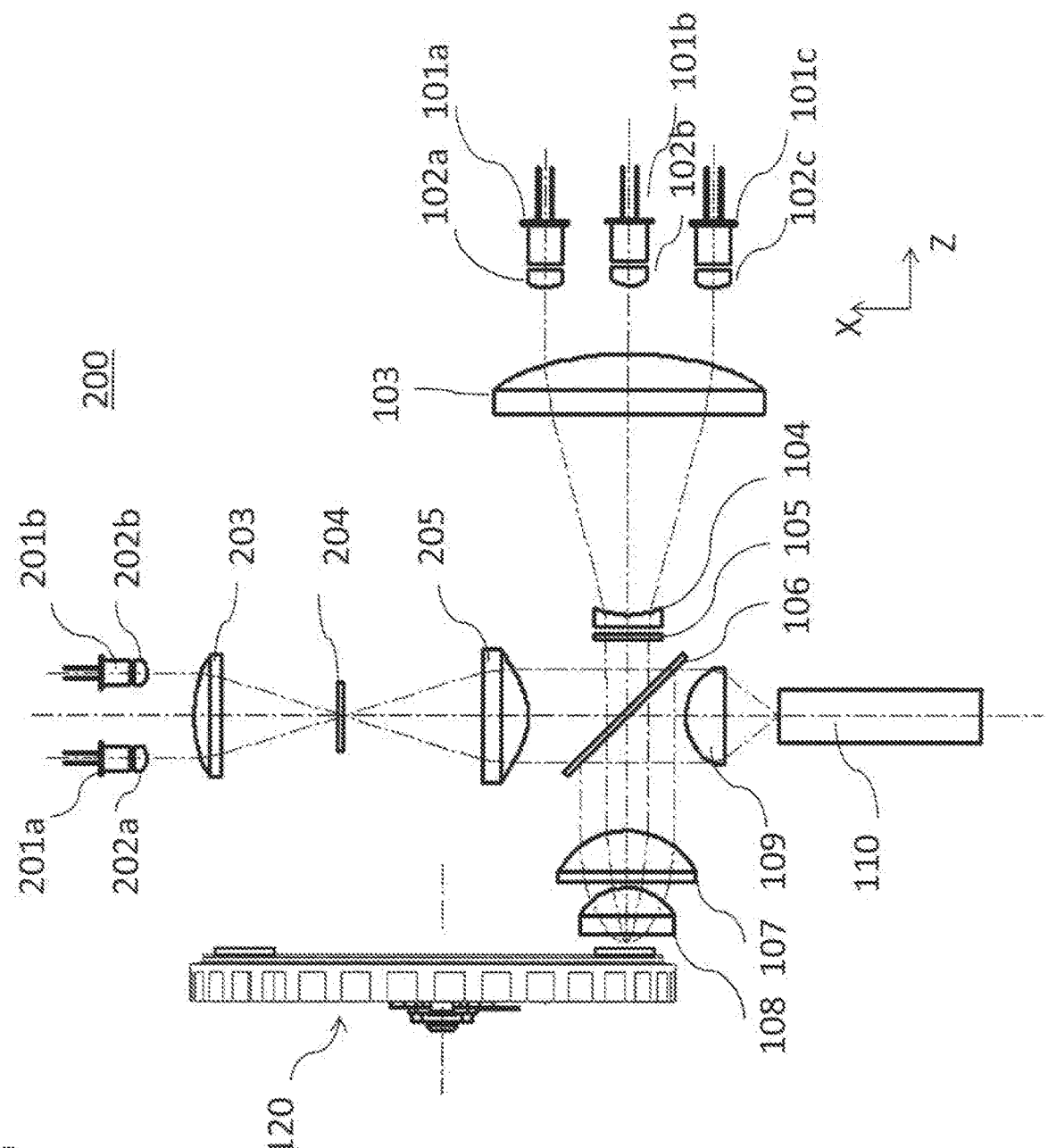
FIG. 9 is a schematic view showing a configuration of a lighting apparatus 200 provided with a phosphor wheel apparatus 120 according to a second embodiment.

FIG. 9 is a schematic view showing a configuration of a lighting apparatus 200 provided with a phosphor wheel apparatus 120 according to the second embodiment. The lighting apparatus 200 of FIG. 9 includes semiconductor laser elements 201a and 201b, collimating lenses 202a and 202b, lenses 203 and 205, and a diffusion plate 204 in addition to the components of the lighting apparatus 100 of FIG. 1, and thus generates output light including color component light of blue light.

The semiconductor laser elements 201a and 201b generate color component light of blue light included in the output light. The blue light emitted from the semiconductor laser elements 201a and 201b in a −X direction is collimated by the collimating lenses 202a and 202b, and then converged by the lens 203 to enter the diffusion plate 204. The blue light incident on the diffusion plate 204 is diffused here, and then converted into substantially parallel light by the lens 205 to enter a dichroic mirror 106. As described above, the dichroic mirror 108 has a characteristic of transmitting blue light and reflecting other color component light, so the blue light incident on the dichroic mirror 106 is transmitted therethrough and travels in the −X direction. As a result, the blue light from the semiconductor laser elements 201a and 201b is combined with yellow light generated by a phosphor 122 and reflected by the dichroic mirror 106 to become white light. The white light is converged on an incident surface of a rod integrator 110 through a lens 109.

As described above, white light can be generated from blue light by using semiconductor laser elements 101a to 101c, 201a, and 201b that generate blue light and the phosphor wheel apparatus 120 that generates fluorescence of yellow light.

2-2. Modified Embodiment

Figure 10:
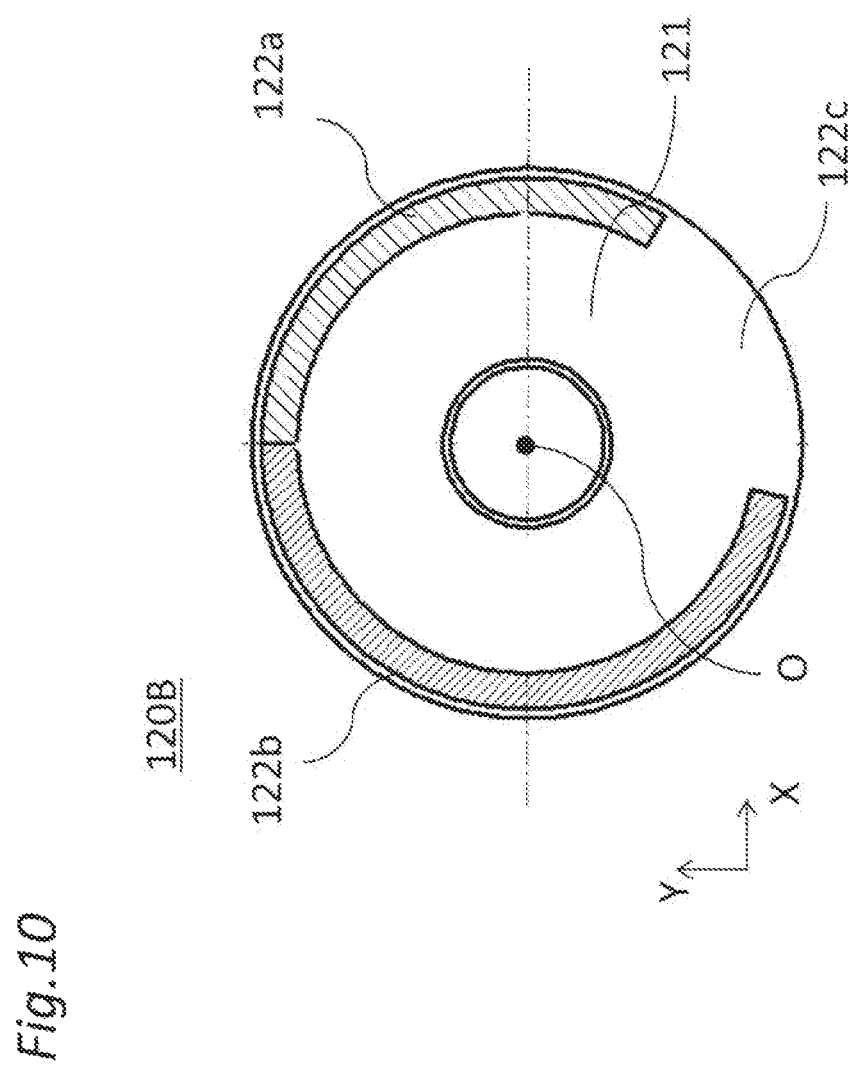
FIG. 10 is a plan view showing a configuration of a front surface of a phosphor wheel apparatus 120B according to a modified embodiment of the second embodiment.

FIG. 10 is a plan view showing a configuration of a front surface of a phosphor wheel apparatus 120B according to a modified embodiment of the second embodiment. The lighting apparatus 200 of FIG. 9 may include the phosphor wheel apparatus 120B of FIG. 10 in place of the phosphor wheel apparatus 120.

The phosphor wheel apparatus 120B includes phosphors 122a and 122b and a non-fluorescent region 122c in place of the phosphor 122 of FIG. 2. The phosphor 122a has a property of being excited by blue light to generate fluorescence of green light. The phosphor 122b has a property of being excited by blue light to generate fluorescence of red light. The phosphors 122a and 122b are formed in plate shapes and disposed on a front surface of a substrate 121. The phosphors 122a and 122b are each formed on predetermined circumferences around a rotation center O of the substrate 121, over predetermined angular ranges, and adjacent to each other. The phosphors 122a and 122b are, for example, sintered ceramics. The phosphors 122a and 122b are each fixed to the substrate 121 by an adhesive in which filler particles are mixed, in a manner similar to that of the phosphor 122 of FIG. 3. The phosphor, the adhesive, and the filler particles are not disposed in the non-fluorescent region 122c, and a surface of the substrate 121 is exposed.

In the lighting apparatus 200 provided with the phosphor wheel apparatus 120B of FIG. 10, the fluorescence of green light and the fluorescence of red light are reflected by the filler particles and travel in the +Z direction of FIG. 1. As described above, the dichroic mirror 106 has a characteristic of transmitting blue light and reflecting other color component light, so that the green light and the red light incident on the dichroic mirror 106 are reflected here and travel in the −X direction. As a result, the green light and the red light generated by the phosphors 122a and 122b and reflected by the dichroic mirror 106 are combined with the blue light from the semiconductor laser elements 201a and 201b to become white light. The white light is converged on the incident surface of the rod integrator 110 through the lens 109.

Note that, when the phosphors 122a and 122b are at angular positions capable of receiving the blue light from the semiconductor laser elements 101a to 101c by the rotation of the phosphor wheel apparatus 1208, the semiconductor laser elements 101a to 101c are turned on, and simultaneously the semiconductor laser elements 201a and 201b are turned off. At this time, the phosphors 122a and 122b are sequentially excited by the blue light to sequentially generate green light and red light. On the other hand, when the non-fluorescent region 122c is at an angular position capable of receiving the blue light from the semiconductor laser elements 101a to 101c by the rotation of the phosphor wheel apparatus 120B, the semiconductor laser elements 101a to 101c are turned off, and simultaneously the semiconductor laser elements 201a and 201b are turned on. Thus, the lighting apparatus 200 generates green light, red light, and blue light sequentially in time division, and outputs the green light, the red light, and the blue light from an emission surface of the rod integrator 110.

As described above, white light can be generated from blue light by using the semiconductor laser elements 101a to 101c, 201a, and 201b that generate blue light and the phosphor wheel apparatus 120B that generates fluorescence of green light and red light.

The phosphor wheel apparatus 120B may further include a reflective layer 127, in a manner similar to that of the phosphor wheel apparatus 120A of FIG. 8.

2-3. Effects etc.

A configuration and effects of the lighting apparatus according to the second embodiment are as follows.

The lighting apparatus 200 of the second embodiment includes: the semiconductor laser elements 101a to 101c, 201a, 201b and the phosphor wheel apparatus 120 or 120A.

As a result, a heated phosphor can be cooled with a simple configuration and with higher efficiency than in a conventional case, and white light can be generated from blue light.

Third Embodiment

Hereinafter, with reference to FIG. 11, a projection type image display apparatus according to a third embodiment will be described.

3-1. Configuration

Figure 11:
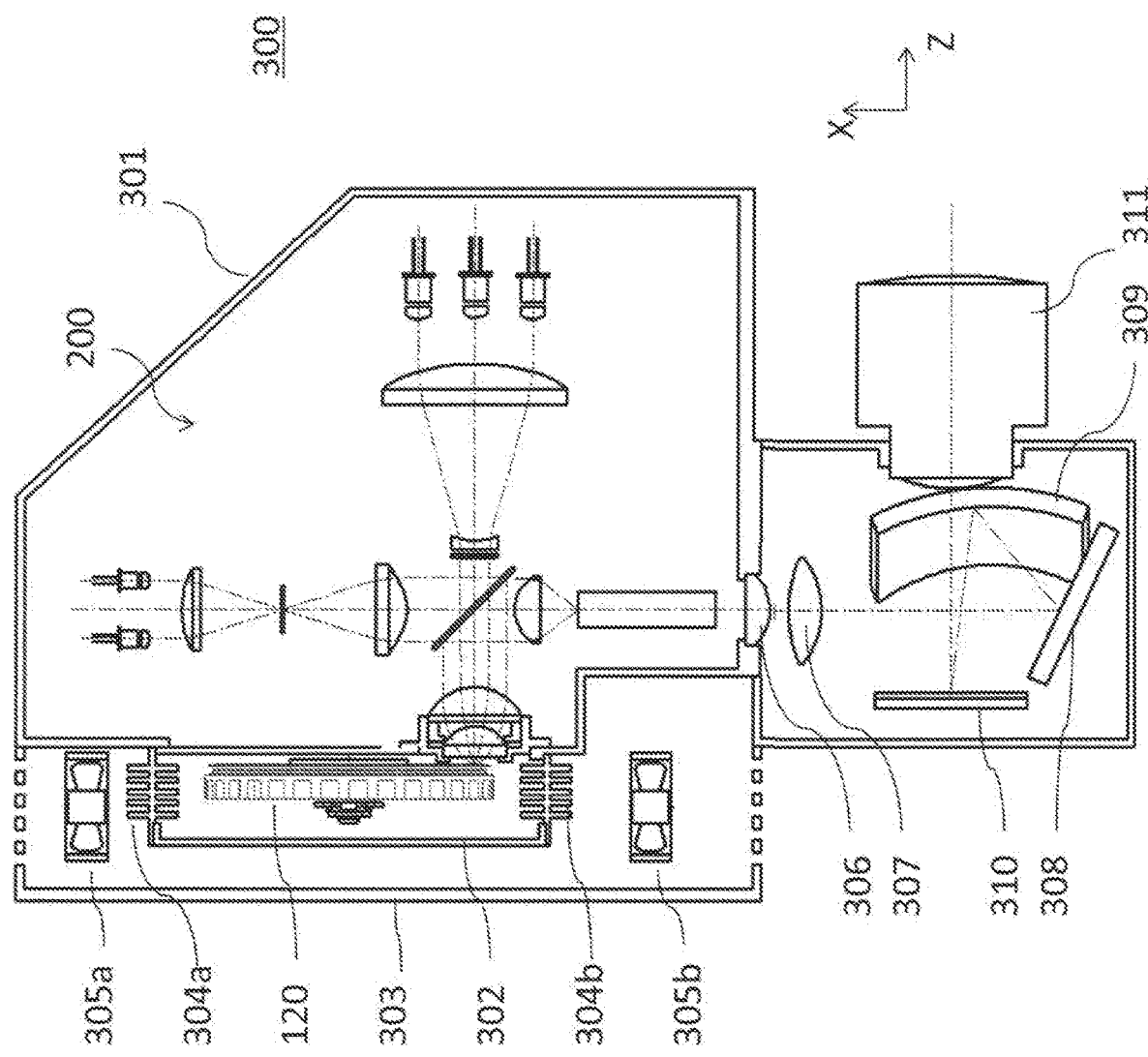
FIG. 11 is a schematic view showing a configuration of a projection type image display apparatus 300 according to a third embodiment.

FIG. 11 is a schematic view showing a configuration of a projection type image display apparatus 300 according to the third embodiment. The projection type image display apparatus 300 includes the lighting apparatus 200 of FIG. 9, a light modulation element which is a digital micro mirror device (DMD), an optical system, and housings for housing them. In the third embodiment, a dustproof structure for dustproof is incorporated in the lighting apparatus 200 according to the second embodiment.

The projection type image display apparatus 300 includes dustproof housings 301 and 302, a housing 303, heat sinks 304a and 304b, fans 305a and 305b, lenses 306 and 307, mirrors 308 and 309, a light modulation element 310, a projection lens 311, and the lighting apparatus 200.

The dustproof housing 301 encloses and houses optical components such as semiconductor laser elements and lenses. The dustproof housing 302 houses a phosphor wheel apparatus 120. The housing 303 accommodates the dustproof housing 302, and the heat sinks 304a, 304b and the fans 305a, 305b for cooling the dustproof housing 302. In particular, since the periphery of the phosphor wheel apparatus 120 generates a large amount of heat, it is separated from the other portions, and a temperature difference from outside air as a refrigerant is increased to improve efficiency of heat exchange.

Hereinafter, the dustproof housing 302 for housing the phosphor wheel apparatus 120 and a peripheral structure thereof will be described.

On side surfaces of the dustproof housing 302, the heat sinks 304a and 304b provided with a plurality of fins on the inside and the outside of the dustproof housing 302 are provided as heat exchange elements. The phosphor wheel apparatus 120 is installed inside the dustproof housing 302 so as to rotate around a rotation axis along a Z-axis. When a substrate 121 of the phosphor wheel apparatus 120 is rotated by a drive apparatus 124, a plurality of fins 123 rotates with the substrate 121, and an air flow generates inside the dustproof housing 302 by the fins 123. The fins on the inside of the heat sinks 304a and 304b are disposed such that the air flow generated by the fins 123 of the phosphor wheel apparatus 120 flows along surfaces of the heat sinks 304a and 304b.

The fans 305a and 305b are each provided in the vicinity of the side surfaces of the dustproof housing 302, and blow cooling air to the heat sinks 304a and 304b. This improves efficiency of heat exchange by the heat sinks 304a and 304b. Thus, air in the housing warmed by heat generated when a phosphor 122 of the phosphor wheel apparatus 120 is irradiated with blue light generated by the semiconductor laser elements flows along the surfaces of the heat sinks 304a and 304b by the fins 123 of the phosphor wheel apparatus 120 and is efficiently dissipated to the outside of the housing 303 by the heat sinks 304a and 304b and the fans 305a and 305b.

Light emitted from a rod integrator 110 passes through the lenses 306 and 307 and is then reflected by the mirrors 308 and 309 to be incident on the light modulation element 310. The light modulation element 310 spatially modulates the incident light from the lighting apparatus 200 in accordance with an image signal from the outside of the projection type image display apparatus 300 to generate image light. The image light generated by the light modulation element 310 is emitted in a +Z direction, enlarged by the projection lens 311, and projected on a screen (not shown).

3-2. Effects etc.

A configuration and effects of the projection type image display apparatus according to the third embodiment are as follows.

The projection type image display apparatus of the third embodiment includes: the lighting apparatus 200; the light modulation element 310 that spatially modulates incident light from the lighting apparatus 200 according to an image signal to generate image light; and the projection optical system 313 for projecting the image light.

As a result, the heated phosphor can be cooled with a simple configuration and with higher efficiency than in the prior art, and thus, image light can be generated and projected with high power.

Other Embodiments

As described above, the preferred embodiments have been described as examples of the technique in the present disclosure. However, the technique in the present disclosure is not limited to this, and can also be applied to embodiments in which changes, substitutions, additions, omissions, etc. are made. In addition, it is also possible to combine the respective components described in the preferred embodiments to form a new embodiment.

The present disclosure is applicable to a phosphor wheel apparatus for a lighting apparatus or a projection type image display apparatus, and in addition, is applicable to a lighting apparatus or a projection type image display apparatus provided with such a phosphor wheel apparatus.

What is claimed is:

1. A phosphor wheel apparatus comprising:
    a substrate made of aluminum alloy having a first light reflectance, the substrate having a first surface and a second surface facing opposite to each other;
    a phosphor layer disposed on the first surface of the substrate;
    an adhesive layer bonding the substrate and the phosphor layer to each other; and
    a drive apparatus configured to rotate the substrate, the substrate having a circular shape, and the phosphor layer having a ring shape;
    wherein the substrate has a plurality of integral fins extending from the second surface of the substrate such that the fins form a one-piece construction with the substrate,
    wherein the adhesive layer includes an adhesive having a first thermal conductivity and filler particles,
    wherein the filler particles have a second thermal conductivity higher than the first thermal conductivity, and have a second light reflectance higher than the first light reflectance,
    wherein the fins are configured to each be in rotational symmetry with respect to a rotation center of the substrate, and an arbitrary radius of the substrate intersects with at least two fins,
    wherein at a position corresponding to an outer periphery of the phosphor layer, when an angle viewing from the first surface to a width of one fin on the second surface is represented by θ1 and an angle viewing from the first surface to a distance between two fins adjacent to each other on the second surface is represented by θ2, each of the fins is formed to satisfy:
    θ1<55° and θ2<140°.

2. The phosphor wheel apparatus according to claim 1, wherein the phosphor layer is made of a ceramic.

3. The phosphor wheel apparatus according to claim 1, wherein the filler particles are made of titanium oxide.

4. The phosphor wheel apparatus according to claim 1, further comprising a reflective layer formed between the substrate and the adhesive layer.

5. The phosphor wheel apparatus according to claim 1, wherein the fins are configured to each be along a part of a spiral.

6. A lighting apparatus comprising:
    a light source element; and
    the phosphor wheel apparatus according to claim 1.

7. A projection image display apparatus comprising:
    the lighting apparatus according to claim 6;
    a light modulation element configured to spatially modulate incident light from the lighting apparatus according to an image signal to generate image light; and
    a projection optical system for projecting the image light.

* * * * *